United States Patent [19]

Abbie

[11] Patent Number: 5,425,080
[45] Date of Patent: Jun. 13, 1995

[54] TRANSACTION TERMINAL APPARATUS AND METHOD USING HOST DIAL STRING CONTROL OF MODEM CONNECT PROTOCOLS

[75] Inventor: Hall E. Abbie, Plano, Tex.

[73] Assignee: Veri Fone, Inc., Redwood City, Calif.

[21] Appl. No.: 63,860

[22] Filed: May 19, 1993

[51] Int. Cl.$^6$ ............................................ H04M 11/00
[52] U.S. Cl. ...................................... 379/98; 379/355; 375/222
[58] Field of Search ........................ 379/91, 93, 96–98, 379/144, 90, 100, 216, 354–357; 375/8, 13, 121

[56] References Cited

U.S. PATENT DOCUMENTS

| | | | |
|---|---|---|---|
| 4,587,379 | 5/1986 | Masuda | 379/91 |
| 4,788,420 | 11/1988 | Chang et al. | 379/91 |
| 4,910,506 | 3/1990 | Yoshida et al. | 379/100 |
| 5,031,207 | 7/1991 | Hesdahl et al. | 379/93 |
| 5,144,651 | 9/1992 | Cooper | 379/98 |
| 5,204,895 | 4/1993 | Yoshiura | 379/100 |

FOREIGN PATENT DOCUMENTS 0380160  8/1990  European Pat. Off. ............ 379/216

*Primary Examiner*—Wing F. Chan
*Attorney, Agent, or Firm*—Lowell C. Bergstedt

[57] ABSTRACT

A transaction terminal having a modem for communicating transaction data to one of a plurality of available host computers, each of which host computers has an associated modem which implements a prearranged one of a standard modem connect protocol and a fast modem connect protocol. The transaction terminal stores separate host dial strings for each host computer and the host dial string includes a predefined communication command structure with a unique fast connect command associated with the fast modem connect protocol. A connect type means accesses the host dial string to determine what type of connect protocol is commanded and the transaction communication module implements the appropriate connect protocol as commanded in the host dial string.

8 Claims, 6 Drawing Sheets

TRANSACTION TERMINAL APPARATUS AND METHOD USING HOST DIAL STRING CONTROL OF MODEM CONNECT PROTOCOLS

FIELD OF THE INVENTION

This invention relates generally to apparatus and methods for point of sale transaction processing and, in particular, to apparatus and methods for implementing fast connection protocols in point of sale transaction terminals.

BACKGROUND OF THE INVENTION

Point of sale (POS) transaction terminals were initially introduced to automate the approval of credit card transactions and to speed the transaction approval process and to reduce credit card fraud. In the mid-1980s, with the introduction of low cost POS transaction terminals like the ZON Jr. (TM) terminal supplied by VeriFone Inc., automated credit transaction processing became affordable to small merchants. As a result transaction automation spread rapidly in stores and restaurants throughout the United States.

As the volume of usage of transaction terminals expanded, merchants and service providers alike became interested in improving the response time of the system to reduce the amount of time consumed by each transaction processing event. In a typical case transaction time can be broken down into several separate component tasks:

1. entering transaction data into the local terminal acting as the authorization request entity;
2. establishing a telephone line connection between the local terminal and a remote host computer acting as the authorization decision entity;
3. handshaking between the data modems at local terminal and host computer in preparation for data communication between them; and
4. actual data processing at the host and data communication of the result from host to terminal where the result is displayed.

In the early days, using 300 baud modems and standard telephone connection and modem handshaking protocols, total transaction time was substantial, but still was a great improvement over the time involved in voice call authorization. As a result, the industry gravitated toward requiring authorization of credit transactions on lower and lower transaction amounts and eventually requiring all credit transactions to be processed through the terminals. As volume of transactions increased, the total transaction time became a matter of concern for both the merchant and the service providers. As a result, various schemes and protocols for reducing the time consumed in each of these component areas of transaction processing have been suggested in the prior art and some have been implemented in practice. These schemes and protocols will be referred to generally as Fast Transaction features. See, for example, U.S. Pat. Nos. 4,796,292 and 5,144,651 for descriptions of fast interconnection and fast modem connection networks and protocols.

Predial by the Terminal

A Predial feature was introduced into the local POS terminals as an early Fast Transaction feature. This feature reduces total processing time for components 1 and 2. A terminal with a Predial feature interrupts the transaction data collection process to dial the host telephone number and thereby starts the process of establishing the telephone line connection so that task will proceed during the same time period that the terminal is completing data entry tasks. Since it typically takes several seconds to establish the telephone connection through the public switched phone network in a normal dial up call, the local terminal operator can finish entering transaction data during the same period that phone connection processing is occurring.

The terminal will typically be ready to transmit its authorization request data packet when the phone connection is established and the modem handshaking is completed. Thus, while Predial doesn't actually reduce processing time for either task 1 or task 2, it reduces overall transaction processing time by having a portion of task 2 running in parallel with a portion of task 1. The operator of the terminal receives the results of the transaction processing sooner than would be the case if the host number is dialed after the transaction data collection and processing is completed.

Fast Connect Schemes.

The term "Fast Connect" is used in this application to refer to protocols to reduce modem handshaking time, also called modem training or modem equalization. The normal Bell 212A Standard modem handshaking process takes about two seconds to complete after the phone connection has been established between the two modems. Fast Connect schemes have been developed to enable to modems with appropriate hardware and software features to reduce this handshaking time to a little over one-half second. Typically, these Fast Connect schemes involve turning on the carrier of the originating modem in the terminal as soon as the host phone number has been dialed, not waiting for answer tones or other signals from the answering modem at the network end. Thus the local terminal itself requires special capabilities to implement this feature.

While this time reduction seems small, it represents a large chunk of the overall transaction processing time on a network when you consider the total transaction volume. Moreover, as "fast interconnect" schemes are implemented to speed up completing the phone line connection between the modems, the time reduction in the Fast Connect protocols becomes more significant.

Fast Interconnect Schemes

The term "Fast Interconnect" is used in this application to refer to protocols; and schemes to reduce the time required for task 2 above, i.e. the time to connect the modem at the local terminal to the modem at the host computer. Advanced features on new computerized telephone switching systems have enabled long distance carriers and transaction processing industry members to develop these Fast Interconnect protocols. The terminal itself is not an active participant in these "fast interconnect" schemes except to the extent that it is required to implement a particular dialing protocol to access the Fast Interconnect feature.

Feature Combinations to Reduce Transaction Time

By combining two or more of the above features, reductions in transaction time can be cumulated. Such combinations are discussed in U.S. Pat. Nos. 4,796,292 and 5,144,651. Individual features and combinations are also discussed in publicly available specifications for certain Network Access Controller products supplied by companies like Hypercom Inc. of Phoenix, Ariz., and Primary Access Corporation of San Diego, Calif. Some transaction service networks have implemented proprietary Fast Interconnect-Fast Connect networks and some long distance carriers are implementing special public access networks for the same purpose.

Local Terminals in this Fast Transaction Environment

A large fraction of the point of sale transaction processing locations which utilize transaction terminals have multiple host processing requirements. For example, a different host telephone number and associated phone network may be utilized for processing a VISA card transaction than an American Express card or Discover card transaction or a proprietary gasoline card or merchant credit card. These different networks are likely to have different combinations of Fast Transaction features communication capabilities or requirements. Some may have Fast Connect modems in the network access controllers while others do not. Some may allow Predial and others may not. Thus, in this multi-host, multi-network environment, it is a challenge for the terminal to be able to handle the different dialing and connection protocols in a facile and cost effective manner which is transparent to the merchant or clerk processing the different transactions.

OBJECTS OF THIS INVENTION

It is the principal object of this invention to provide improved apparatus and methods for point of sale transaction processing.

It is a specific object of this invention to provide improved apparatus for controlling the communication of transaction data from a transaction terminal to a host computer via a public telephone network.

It is a further object of this invention to provide an improved method for controlling the use of various communication protocols in a point of sale transaction terminal.

Features and Advantages of this Invention

One aspect of this invention features a transaction terminal having a modem for communicating transaction data to one of a plurality of available host computers with each of the available host computers having an associated modem which implements a prearranged one of a standard modem connect protocol and a fast modem connect protocol. The terminal includes means for storing a separate host dial string for each of the host computers, the dial string including a predefined communication command structure with a unique fast connect command associated with the fast modem connect protocol. A transaction initiate means initiates a transaction and includes host selecting means for selecting a designated host from the plurality of available host computers. A connect type means responsive to the transaction initiate means accesses the host dial string associated with the designated host and determines if the unique fast connect command is present in the dial string. A transaction processing means processes transaction data input. A transaction communication means includes modem training means responsive to the connect type means for carrying out the fast modem connect protocol when the connect type means determines that the unique fast connect command is present in the host dial string and for carrying out the standard modem connect protocol when the unique fast connect command is not present in the host dial string.

The use of a dial string which includes a defined command structure to invoke a fast connect feature provides the advantage of easy configuration of the terminal for communicating with a variety of host which implement different communication parameters. The terminal has complete flexibility to communicate with maximum facility with a number of hosts without requiring new programming modules to be loaded when communication conditions change or new host computers are added to the network.

Another aspect of this invention features a method for communicating transaction data via a modem from a transaction terminal to one of a plurality of associated host computers each of which has an associated modem which implements a prearranged one of a standard modem connect protocol and a fast modem connect protocol. The method includes the steps of:

a. defining a host dial string format including a communication command structure with a unique fast connect command associated with the fast modem connect protocol;

b. storing in the transaction terminal a separate host dial string for each associated host in accordance with the defined host dial string format;

c. selecting one of the associated hosts for receipt of transaction data associated with a current transaction;

d. retrieving from the memory of the transaction terminal the stored host dial string for the selected host;

e. examining the retrieved host dial string to determine if the unique fast connect command is present;

f. carrying out the steps of the fast modem connect protocol if the fast connect command is present; and g. carrying out the steps of a standard modem connect protocol if the fast connect command is not present.

This method has the same advantage mentioned above, namely that use of the dial string to invoke communication features makes set up of the terminal easy and use of the terminal in various communication modes with various host computers transparent to the user. The communication parameters and protocols can readily be altered if the host computer system changes its protocols.

Other object, features and advantages of this invention will be apparent from a consideration of the detailed description in connection with the drawings.

BRIEF DESCRIPTION OF THE DRAWING FIGURES

FIG. 2A is a block diagram of a data communication network useful for illustrating the utility of the apparatus and method of this invention.

DESCRIPTION OF THE INVENTION AND EMBODIMENTS

General Principles

The system and method of this invention is based on defining a dial string format which contains prearranged command byte locations. Prearranged unique command characters are optionally stored in command bytes locations and the operating system of the terminal interprets and uses these command characters to invoke the execution of various dialing routines or communication protocols involved in Fast Transaction schemes.

In a particular embodiment, the dial string format is defined as follows:

[C-1] (dialing digits and characters) [C-2]

where

C-1 and C-2 are optional command character positions and C-1 can take one of the following values:
"R" to invoke a Predial protocol
"P" to invoke Predial plus Fast Connect C-2 can take one of the following values:
"P" to invoke Post Dial plus Fast Connect
"L" to call a Log-In Specifier Routine
"X" to call a Log-In Control String Routine It should be apparent that the actual alphabetic characters used as command characters are selectable and can be varied within the framework of the operating system and application command language and syntax.

It should also be apparent that alternative dial string formats could be employed. For example, two separate command character positions could be used at the beginning of the dial string, one for invoking predial and the other for separately invoking Fast Connect. The operating system would then examine both of these character positions, assess their content and invoke appropriate routines as specified. In this alternative case, R alone at the beginning of the dial string would mean Predial but no Fast Connect. P alone would mean no Predial but Fast Connect on Post Dial. R and P together would mean Predial and Fast Connect together and the R should be the first character in the Dial String.

Each of the host computers and associated access networks will have a separate predefined dial string associated therewith and stored at a prearranged location in the memory of the terminal. Accordingly, the terminal user easily customizes the dialing and communications protocol for each available host during initial terminal configuration, a process which is usually performed just prior to placing the terminal into operation. It should be apparent that, as various hosts alter their dialing and communication protocols, it is a simple matter to modify the operation of the terminal by changing the dial string stored for those hosts.

System Environment—Example

Figure 1:
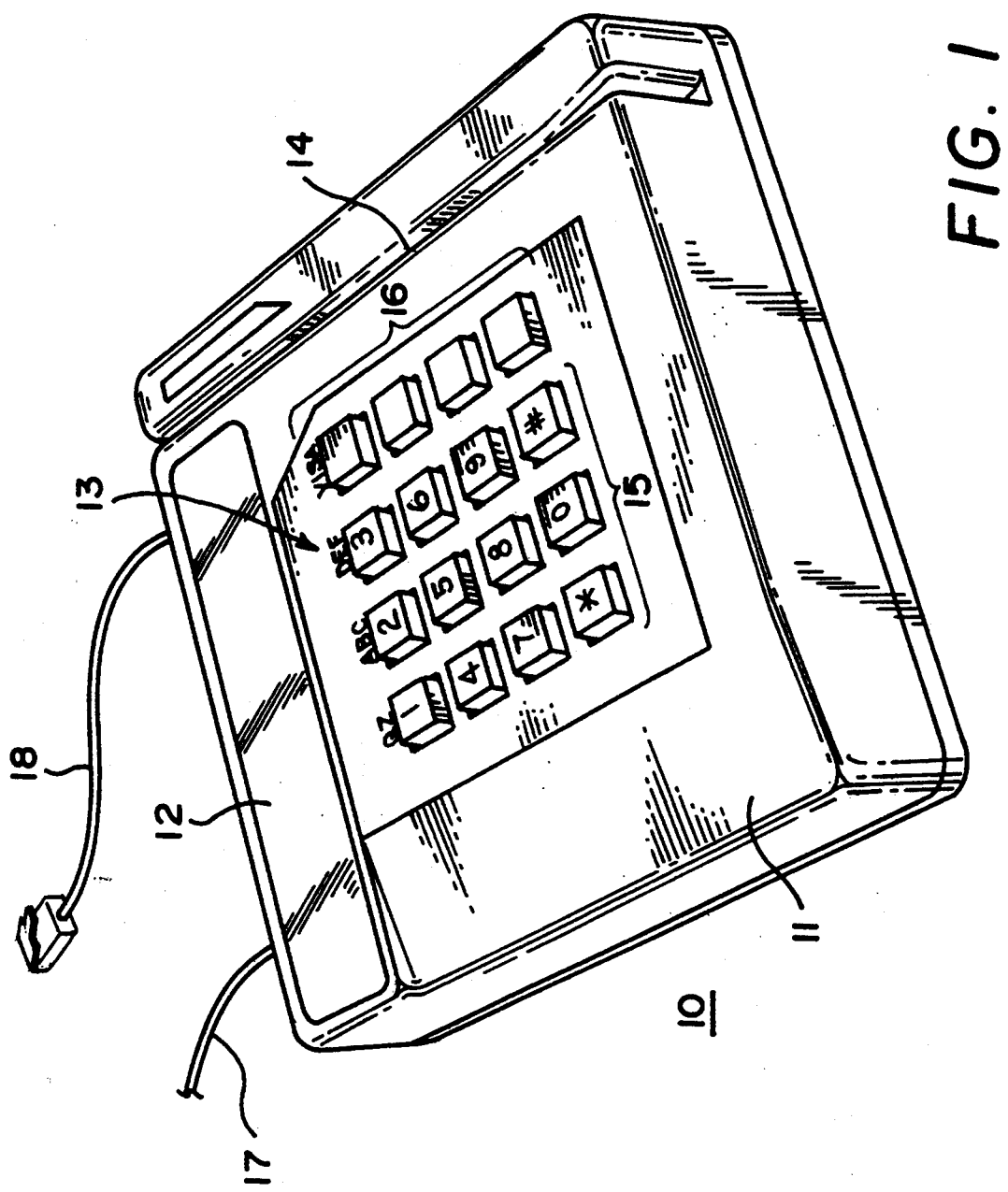
Fig. 1 is a perspective view of a point of sale transaction terminal in which the apparatus and method of this invention may be deployed.
Figure 2:
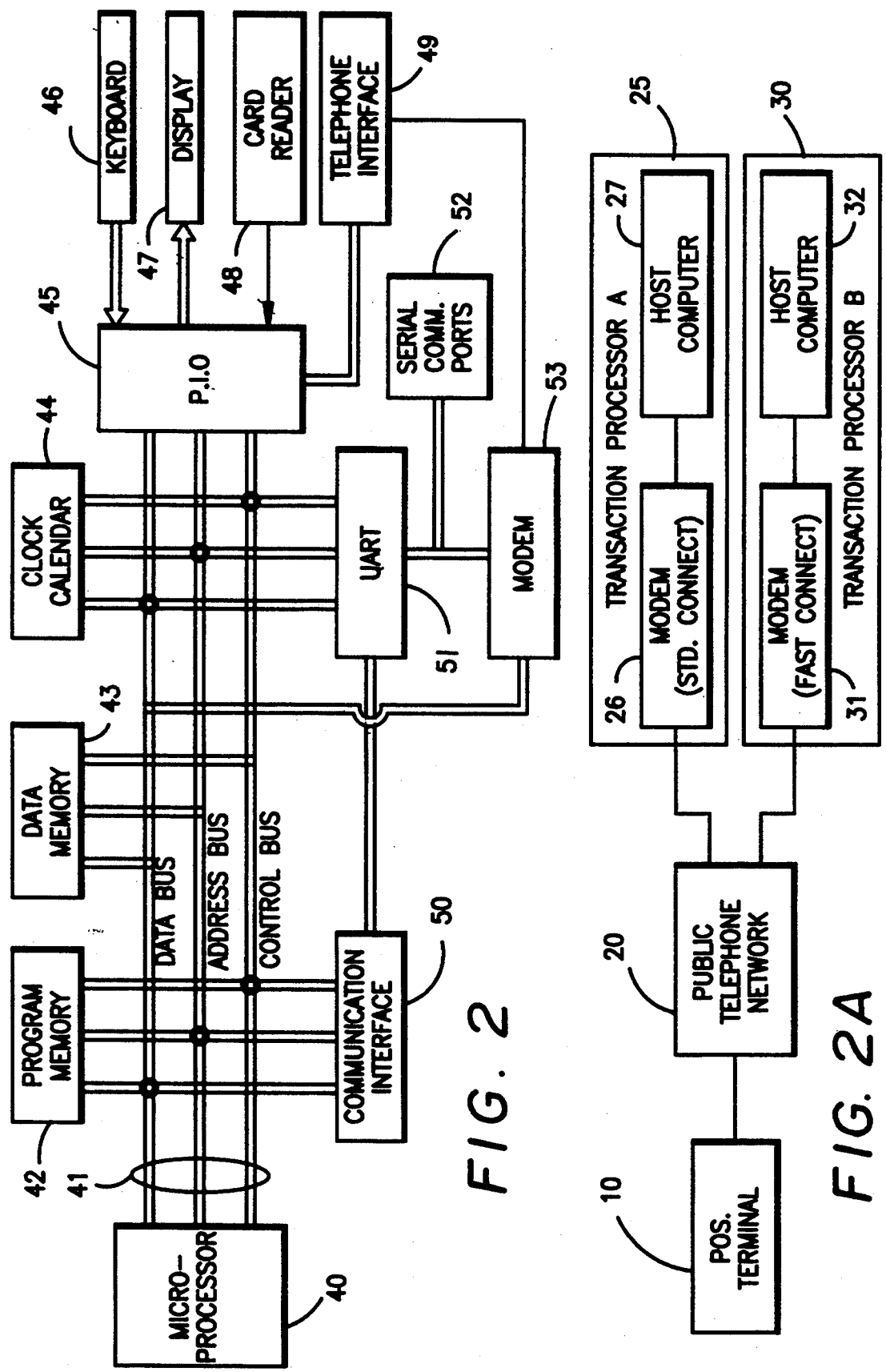
FIG. 2 is a block diagram of the electronic subsystems of a point of sale transaction terminal in which the apparatus and method of this invention may be deployed.

FIG. 1 illustrates the external features of a point of sale terminal in which the system and method of this invention may be implemented. FIG. 2 is a block schematic diagram of the functional electronic subsystems of a typical point of sale terminal. FIG. 2A. is a simplified block diagram of an overall transaction processing network in which the system and method of this invention may be employed.

As shown in FIG. 1, a point of sale terminal 10 comprises a housing 11 on the top surface of which is an alphanumeric display 12 and a keyboard 13. A card slot 14 if formed in the housing and a card reader (not shown) is associated with card slot 14 to read data on a magnetic stripe data card when the card is swiped through card slot 14. Keyboard 13 includes a 3×4 array of keys 15 in the form of a typical telephone keypad and a 1×4 array of keys 16 which serve as function keys. Terminal 10 will typically be connected to a power source via a power cord 17 and a telephone cord and jack 18 will typically be used to connect terminal 10 to a phone line which provides access to the public switched telephone network.

A transaction is typically initiated either by swiping a card through the card reader (to initiate a default type transaction) or by depressing one of the function keys 16 labeled with the name of the card or the processor for the card. For example, each of the function keys 16 may be a host key labeled with different card companies such as VISA, MC (for MASTERCARD), AMEX (for American Express), etc. Each of these different transaction hosts may have a different phone number to call and, according to this invention, a specific host dial string will be stored for each associated host key and called when that key is depressed to initiate a transaction.

Other transaction processing steps involve entering swiping the associated card (if not done already), entering the transaction amount, and pressing the send key. The terminal then automatically handles the placing of the call to the designated host, sending a data packet containing the transaction data, receiving back a host message approving or disapproving the transaction, and displaying an approval number or other relevant message. The terminal will also automatically handle any other data processing and/or recording steps which are implemented in the application program of the terminal. These functionalities are not part of this invention and need not be explained in detail here.

FIG. 2A shows a transaction terminal 10 connected into a public telephone network 20 which provides data communication access to transaction processing equipment 25 associated with transaction processor A and different equipment 30 associated with transaction processor B. As shown, a standard connect modem 26 is provided with host computer 27 in installation 25 while a fast connect modem 31 is provided with host computer 32 in installation 30.

FIG. 2 illustrates in a simplified block diagram the typical electronic subsystems in a transaction terminal. A microprocessor 40 is coupled via a system bus 41 which has data, address and control lines, to a program memory 42 and a data memory 43. Program memory 42 stores operating system and application program instructions which control the features and functions of the terminal. Data memory 43 stores terminal configuration data, such as predefined dial strings associated with different host computers and associated access networks, and data associated with transaction processing. A clock-calendar chip 44 provides automatic date and time information which may be used to time stamp transactions. A programmable I/O module 45 provides data and control input/output interfacing to keyboard 46, display 47, card reader 48, and telephone interface 49. Communication interface 50 and UART 57 provide data communications via modem 53 and serial communication ports 52. The functioning of these various subsystems is well known to those in the art of microcomputer systems and needs not be explained here. The operating system program steps which are set forth in the description below are carried out by this microcomputer system in a well known manner. The various modules and the functional control of the microprocessor provide the specific means for implementing the system and method features of this invention in a manner also well known to persons skilled in this art from the description provided herein.

System Operation—Simplified Version

Figure 3:
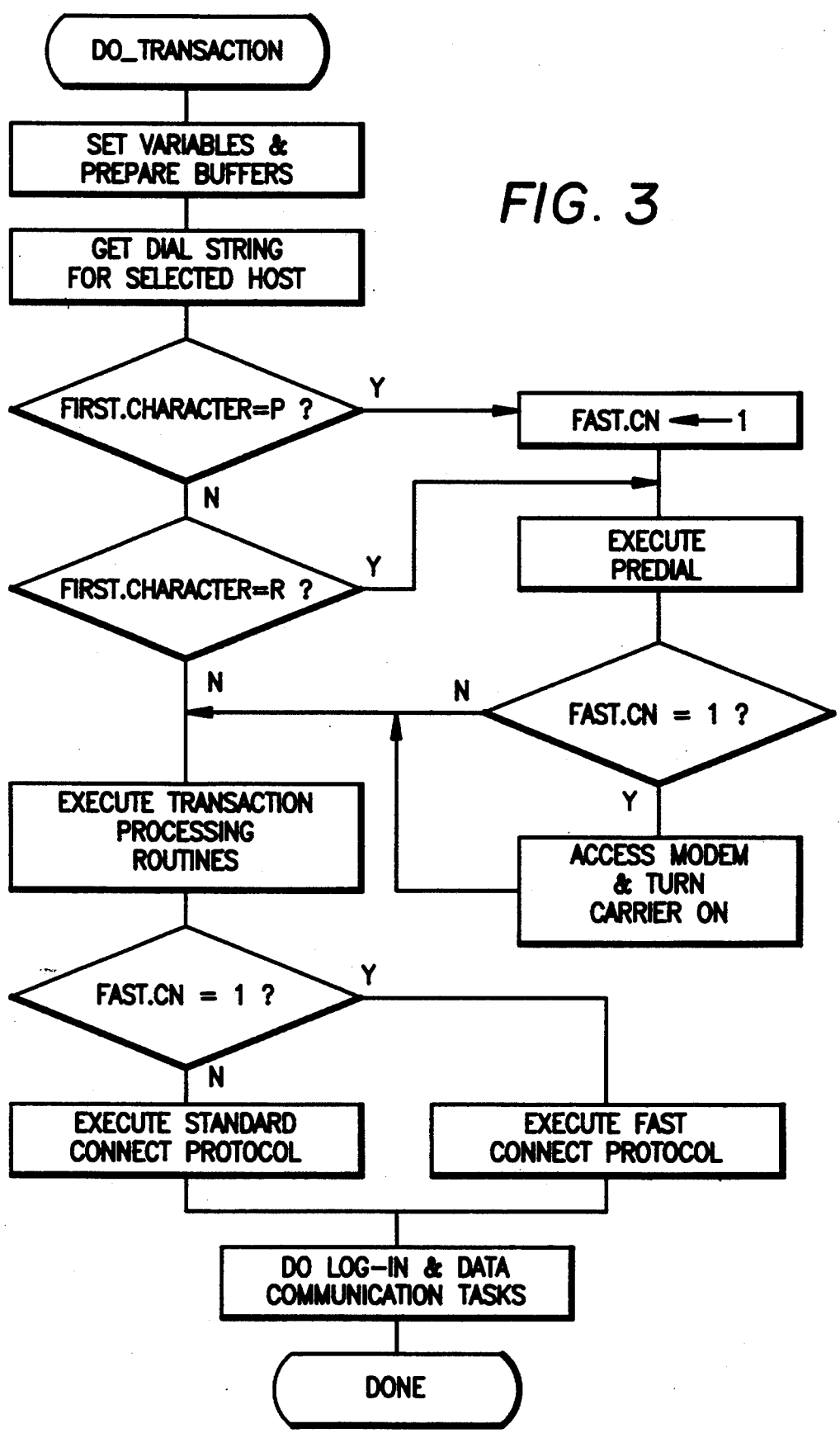
FIG. 3 is a flow diagram illustrating the operation of one embodiment of the apparatus and method of this invention.

Referring now to FIG. 3 a simplified version of an operating system routine named DO_TRANSACTION and implementing the features of this invention will be described. However, in this simplified example, we will assume that there is no provision made for invoking the Fast Connect Protocol by a command letter as the last character in the Dial String. In other words there is no use of Fast Connect except together with the Predial Feature.

The first step of the DO_TRANSACTION routine involves executing a plurality of typical tasks to set variables and prepare data buffers that will be used in the routine. The next step is to get the Dial String for the selected host. This typically involves fetching the Dial String from a stored memory table location using the host information to determine the appropriate table address or location. Next the D_TRANSACTION routine examines the first character in the Dial String and tests to determine if First.Character is equal to P. It will be remembered that P has been defined to signify Predial plus Fast Connect. If this testing step returns YES, then the flag FAST.CN is set (loaded with value 1) followed by execution of the Predial routine. If this testing step returns NO, then a second testing step is executed to determine if First.Character is equal to R. It will be remembered that R has been defined to signify Predial without Fast Connect. If this second testing step returns YES, then the Predial Routine is executed without setting the FAST.CN flag.

In this simplified example, we are assuming no concurrent operations in the terminal. Following execution of the Predial routine, which typically ends with the dialing of the last digit in the Dial String, a testing step is executed to check the value of the FAST.CN flag. If FAST.CN is equal to 1, i.e. has been set previously, this testing step returns YES, and routines to access the modem and turn on the carrier are executed. Otherwise, if this testing step returns NO, transaction processing routines are executed to collect the transaction data via data entry and other tasks. Following this, a testing step check the status of the FAST.CN flag. If FAST.CN is 1, a Fast Connect Protocol is executed followed by Log-In and data communication tasks. If the testing step on the FAST.CN flag returns NO, a standard modem connect protocol is executed followed by Log-In and data communication tasks. As an example, the Fast Connect Protocol which is implemented on NACs supplied by Primary Access will be described. As described above, the transaction terminal initiates the Fast Connect Protocol by turning on carrier immediately after the last digit of the phone number has been dialed without waiting for any ringback signal or any network modem tones such as answer tone. The answering modem is tolerant of the presence of carrier from the sending modem when it answers the incoming call. The answering modem sends unscrambled binary ones during a qualification interval of 100 milliseconds, i.e. while training and equalizing on the carrier from the sending modem, and then starts sending its carrier: scrambled binary ones. The answering modem asserts Carrier Detect and Clear to Send 100 milliseconds after its transition to sending scrambled binary ones. In the sending modem, 100 milliseconds after detecting the transition in the signals from the answering modem to scrambled binary ones, Carrier Detect and Clear to Send are asserted.

From this explanation, it is seen that the sending modem eliminates the period of listening for unscrambled binary ones from the answering modem and the silent interval before turning on sending carrier, both of which are present in the standard protocol.

Implementation Using a Concurrent Task Operating System

The Verifone TRANZ 330 terminal, illustrated in FIGS. 1 and 2, utilizes an interrupt driven, concurrent task operating system. This type of operating system initiates execution of routines to perform certain I/O tasks and then uses routines called in response to timer interrupts to check on the progress of those tasks and call other routines depending on the status of execution.

Thus the basic background routine of the operating system is the Interrupt Service Routine (ISR). A transaction is initiated by the operator of the terminal by either pressing one of the HOST keys or by swiping a magnetic stripe card through the card reader. The card swipe step to initiate a transaction indicates a 'default' transaction type which is typically defined as a VISA credit authorization. Either of these actions generates a unique interrupt to the microprocessor which is detected by the ISR which responds by calling a Card_Transaction routine if a card swipe produced the interrupt or a Key_Transaction routine if a Host key depression produced the interrupt. The Card_Transaction routine executes some preliminary program steps associated with the default transaction and then falls through to the steps of the Key_Transaction routine where this description will start with reference to the flow chart in FIG. 4.

It should be noted that the flow charts contain a simplified version of the routines for purposes of explaining the operation of the TRANZ terminal with the system and method of this invention incorporated within the operating system routines. This explanation is sufficient to enable persons of skill in the art to implement the invention without including unnecessary details.

Figure 4:
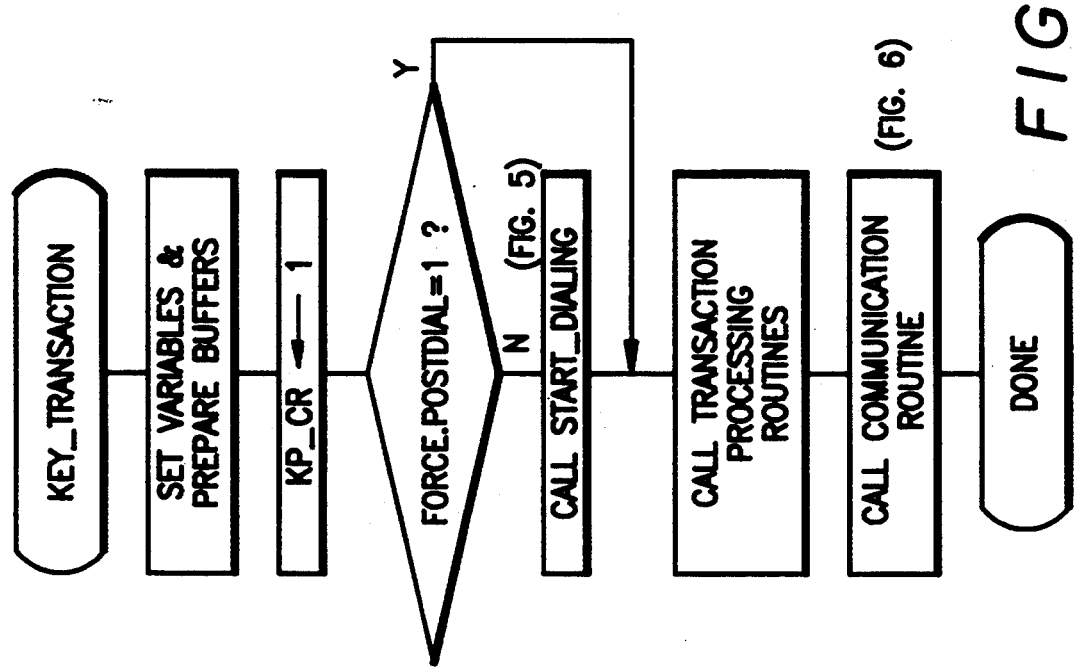

Referring now to FIG. 4, a Key_Transaction routine begins with doing certain required variable setting and buffer initiation tasks. Then the KP_CR flag (KeyPress_CardRead) is set equal to one. This provides a return pointer to this routine for the Start_Dialing routine which is callable by different routines. The next step is to check whether the Force. Postdial flag has been set. The operator of the terminal can set it into a forced postdial mode by hitting the Backspace key followed by a card swipe or depression of one of the host keys. If this Force. Postdial flag is set, the step of calling the Start_Dialing routine is bypassed. The Start_Dialing routine is where predial is initiated, so bypassing that routine forces the terminal to dial only after all transaction routines have been completed.

If the Force. Postdial flag is not set, the Start_Dialing routine is called to check on whether a Predial feature is to be invoked (see description below), followed by steps to call Transaction Processing Routines (not part of this invention and thus not described) and then a Communication Routine which is discussed below.

Figure 5:
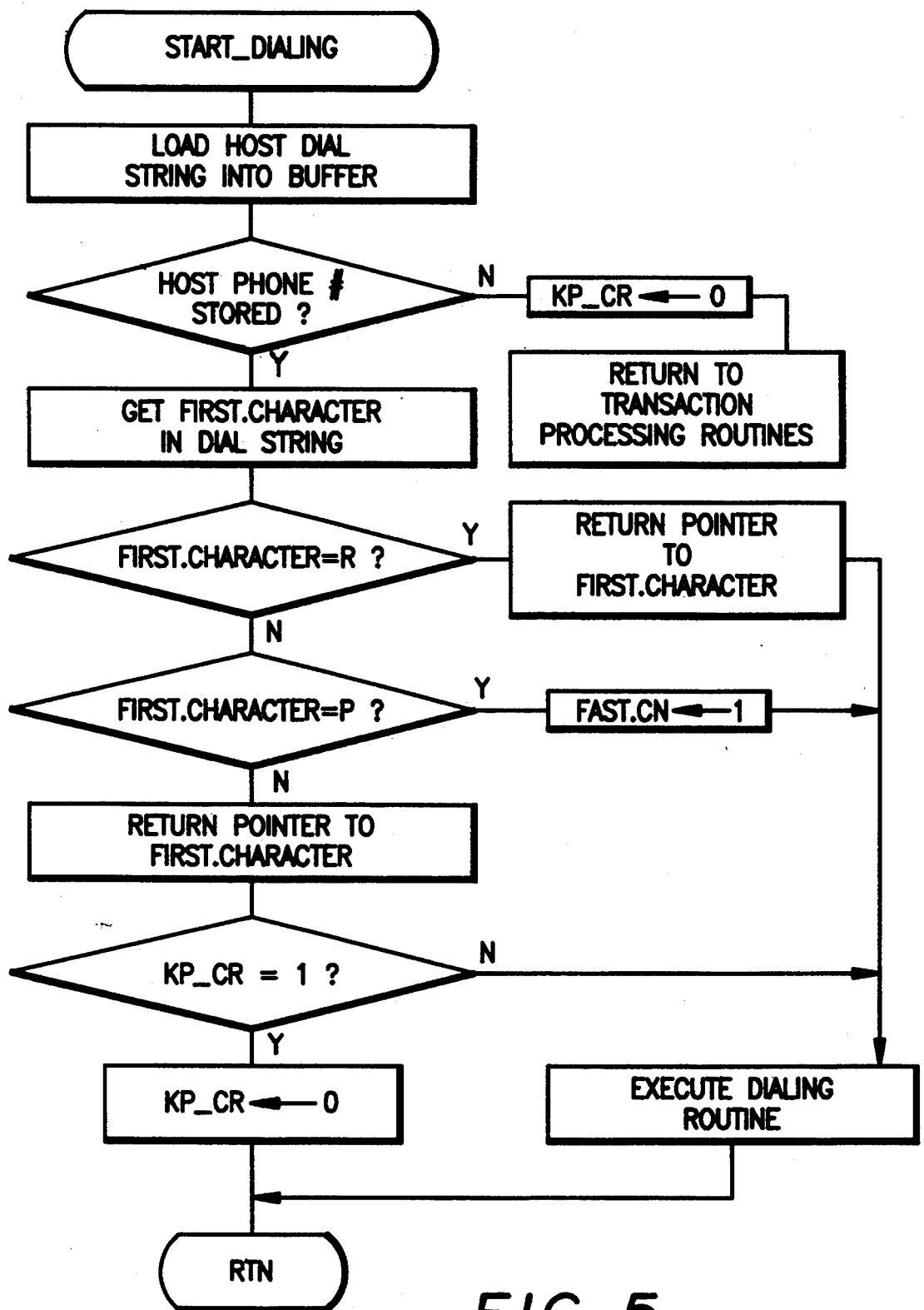

The Start_Dialing routine is part of an overall dial command processing routine and the basic functions of this routine are shown in the flow chart of FIG. 5. The Dial String for the selected Host is loaded into a buffer and then a testing step is executed to make sure that a Host Phone Number is actually present. If there is no Host Phone Number stored, this testing step returns NO, the return flag is cleared and the terminal operation returns to Transaction Processing Routines. This action could occur, for example, if the terminal operator pressed a host key which is not active host, i.e. no host phone number and other information was loaded in during set up.

If there is a Host Phone number stored, this testing step returns YES, and the next step involves getting the First. Character of the Dial String, followed by two sequential testing steps to determine if First. Character is either R or P. If First.Character is a number, both testing steps will return NO. This means that neither the Predial feature or the Predial+Fast Connect feature are to be used for connecting to this Host. The character pointer is returned to the First. Character in the Dial String buffer. Next the KP_CR flag flag is examined to determine if this routine was entered from the Key_ Transaction routine. If this testing step returns YES, then the KP_CR flag is cleared and a return is executed. If it returns NO, execution proceeds with executing the steps of the Dialing Routine.

If First.Character is R, the first testing step returns YES, the character pointer is returned to the first character in the buffer and a Dialing Routine is executed since the character R indicates the a Pre-dial should be done for this Host. If the first testing step returns NO, because First. Character is P, then the second testing step returns YES, and the FAST.CN flag is set prior to executing the Dialing Routine. This will invoke both Predial and Fast Connect features.

Figure 7:
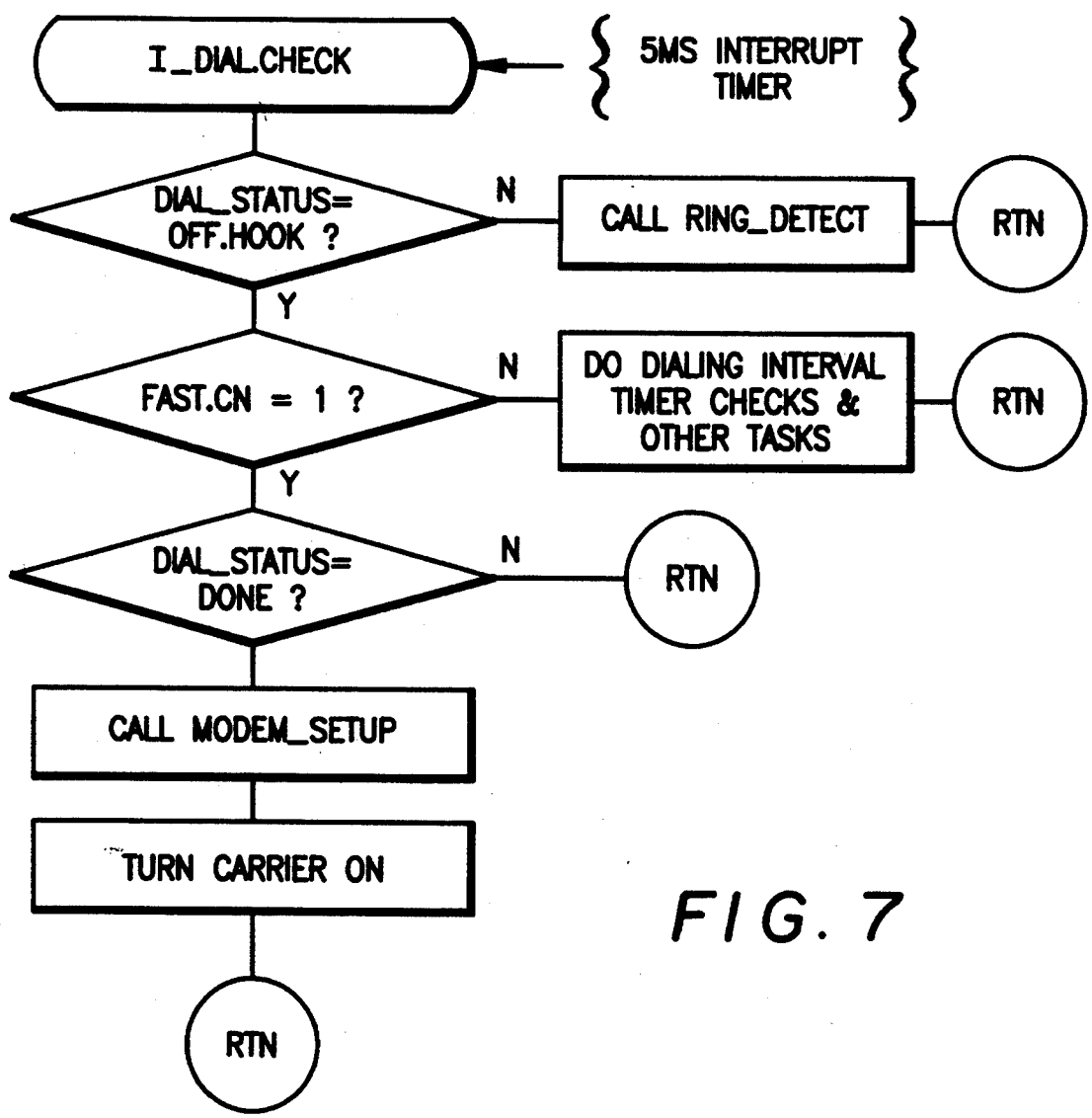

The steps of the Dialing Routine are not charted since this routine is not part of this invention. The Dialing Routine basically gets each character in the Dial String in turn and uses those character representing the telephone number to actually dial the digits of the number. As part of its execution, the Dialing Routine re-examines the First.Character and makes sure the FAST.CN flag is set if it is a P. The dialing routine will also set the FAST.CN flag if the last character in the Dial String is P. The Dialing Routine also sets a Dial_Status flag to various values relating to its status of operation so that timer interrupt routines and other routines called at various points will know the dialing status. For example, as will be discussed below, the Communication routine uses the dialing status flag to determine if Predial has already been invoked or if it needs to call the Start_Dialing routine. To continue the description, it will be assumed for the present that the Start_Dialing routine found P as the First.Character, and the Dialing routine is being executed with the FAST.CN flag set. The dialing status of the system is checked on a timer interrupt basis every five milliseconds. This interrupt invoked dial status checking routine, named I_Dial_ Check is shown in FIG. 7. The first step in this routine is a testing step to determine if the Dial_Status flag is set to a value which indicates Off-.Hook. If the terminal is not off hook, then a Ring_Detect routine is called to determine if there is an incoming call to the terminal. The TRANZ terminal may receive incoming calls for purposes of invoking diagnostic routines, loading new Host tables, or performing other modifications of the set up of the terminal under the control of a host computer.

If Dial_Status is Off. Hook because a Dialing Routine has already been called for execution, then a YES will be returned and the next checking step is executed to determine if the flag FAST.CN has been set. Since it has been assumed that P was found as the value of First.Character, the FAST.CN flag was set in the Start_Dialing routine as previously described. Consequently, under the presently assumed conditions, this testing step on the FAST.CN flag returns YES. At this point, another testing step is done on the Dial_Status flag to determine if the dialing status is DONE, meaning that all of the digits of the phone number have already been dialed. If this testing step returns YES, then a Modem_Setup routine is called, and the send carrier is turned on to start the Fast Connect protocol.

If the FAST.CN flag was not set, note that this routine simply does other checking tasks associated with dialing such as dialing interval timing checks. These are associated with other functions not related to this invention and thus need not be discussed.

So, under our assumed condition that the first character in the Dial String is P, the Predial portion of this feature is invoked in the Start_Dialing routine routine of FIG. 5 as described above and the step of turning on the Carrier immediately after completion of dialing is taken care of in the I_Dial Check routine of FIG. 7. The remainder of the fast connect protocol is invoked in the Communication routine itself which is shown in FIG. 6.

Note that the I_Dial_Check routine used to turn on the Send Carrier after dialing is finished. This step could also be done in the Dialing routine itself after the last digit is dialed if the FAST.CN flag has been set. However, it has been determined that it is safer to perform the step in one of the routines called by the Interrupt Service routine because of the kinds of checking steps that are performed in the Interrupt Service routine.

Figure 6:
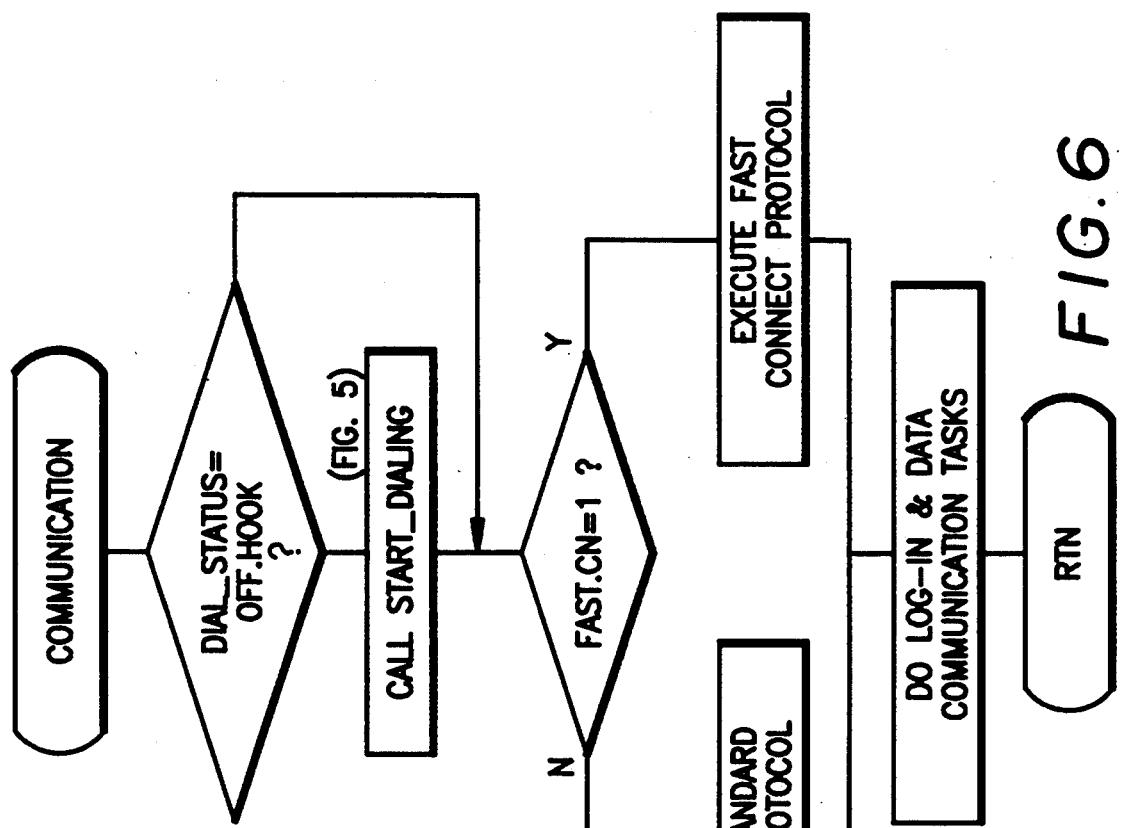
FIGS. 4–7 are flow diagrams illustrating the operation of another embodiment of the apparatus and method of this invention.

The Communication routine shown in FIG. 6 also starts with a testing step to determine if the Dial_Status flag indicates an Off.Hook condition. This testing step is included because this routine needs to determine if it was called after a Predial was already initiated. If this testing step returns YES because a Predial has been previously invoked, the step of calling the Start_Dialing routine is skipped. Otherwise the Start_Dialing routine is called to begin the dialing process. The next step is a testing step to determine if the FAST.CN flag has been set. Remember that this FAST.CN flag may have been set either in the Start_Dialing routine if First.Character is P or in the Dialing routine if the last character in the Dial String is P.

If this testing step on FAST.CN returns YES, then a Fast Connect Protocol routine is executed, followed by execution of routines to perform Log-In and Data Communication tasks. If this testing step on FAST.CN returns NO, then a Standard Connect Protocol is executed, followed by Log-In and Data Communication tasks.

The general aspects of a particular Fast Connect protocol are discussed above. The steps of a standard connect protocol are well known and need not be discussed here.

The above description of embodiments of the invention is given to illustrate the general principles of the invention. Numerous changes could be made by persons skilled in this art without departing from the scope of this invention as claimed in the following claims.

What is claimed is:

1. A transaction terminal apparatus having a modem for communicating transaction data to one of a plurality of available host computers, each of said available host computers having an associated modem which implements a prearranged one of a standard modem connect protocol and a fast modem connect protocol, said transaction terminal apparatus comprising:

memory means for storing a separate host dial string for each of said host computers, said dial string including a telephone number for said host computer and a predefined communication command structure with a unique fast connect command associated with said fast modem connect protocol;

transaction initiate means for initiating a transaction including host selecting means for selecting a designated host from said plurality of available host computers;

connect type means responsive to said transaction initiate means for accessing said memory means to get the host dial string associated with said designated host and for determining if said unique fast connect command is present in said designated host dial string;

transaction processing means for processing transaction data input; and transaction communication means including modem training means responsive to said connect type means for carrying out said fast modem connect protocol when said connect type means determines that said unique fast connect command is present in said host dial string and for carrying out said standard modem connect protocol when said unique fast connect command is not present in said host dial string.

2. Transaction terminal apparatus as claimed in claim 1, adapted for use in an environment in which each of said available host computers is accessed via one of a plurality of data communication channels and at least one of said data communication channels includes a public telephone network and permits use of a predialing protocol involving dialing a host computer telephone number prior to completion of transaction data processing at said transaction terminal;

wherein said predefined communication command structure includes at least one designated predial command associated with said predialing protocol and a host telephone number; and said transaction terminal apparatus further includes dialing means for accessing said host dial string to obtain the host telephone number therein, for accessing said public telephone network, and for dialing said host telephone number to establish a data connection to said designated host;

dial type means responsive to said transaction initiate means for accessing said host dial string associated with said designated host and for determining if said predial command is present in said host dial string; and predial means for activating said dialing means to establish a connection to said host computer prior to the completion of data input processing by said transaction processing means.

3. Transaction terminal apparatus as claimed in claim 1, wherein said predefined communication command structure in said host dial string comprises a first character position which consists of one of the following:

a numeric character comprising the first digit of a host telephone number to indicate that no predial protocol is to be utilized, a first alphabetic character to indicate that a predial protocol is to be utilized but a fast connect protocol is not to be utilized, and a second alphabetic character to indicate that both a predial protocol and a fast connect protocol are to be utilized;

and said connect type means and said dial type means are combined in a single means for accessing said host dial string, for said predial means if said first character position contains either of said first or second alphabetic characters, and for signaling said modem training means to carry out said fast modem connect protocol when said first character position contains said second alphabetic character.

4. Transaction terminal apparatus as claimed in claim 3, wherein said predefined communication command structure in said host dial string further comprises a last character position which consists of one of the following:

a numeric character comprising the last digit of a host telephone number to be dialed, or an alphabetic character which may comprise said second alphabetic character to indicate that a fast connect protocol is to be utilized regardless of whether a predial protocol is utilized, and said transaction terminal apparatus further includes a dial string processing means which examines and responds to each character of said dial string in turn and includes means for signaling said modem training means to utilize said fast modem connect protocol when the last character in said dial string is said second alphabetic character.

5. In a method for communicating transaction data via a modem from a transaction terminal to one of a plurality of associated host computers each of which has an associated modem which implements a prearranged one of a standard modem connect protocol and a fast modem connect protocol, said method comprising the steps of:

a. defining a host dial string format including a host telephone number and a communication command structure with a unique fast connect command associated with said fast modem connect protocol;

b. storing in said transaction terminal a separate host dial string for each of said associated host computers in accordance with said defined host dial string format, and including said unique fast connect command in said host dial string only if said associated host computer is compatible with said fast modem connect protocol;

c. selecting one of said associated host computers for receipt of transaction data associated with a current transaction;

d. retrieving from the memory of the transaction terminal the stored host dial string for the selected host computer and dialing the host telephone number in said stored host, dial string;

e. examining said retrieved host dial string to determine if said unique fast connect command is present;
f. carrying out the steps of said fast modem connect protocol if said fast connect command is present; and
g. carrying out the steps of a standard modem connect protocol if said fast connect command is not present.

6. The method of claim 5, adapted for use in an environment in which each of said associated host computers is accessed via one of a plurality of data communication channels and at least one of said data communication channels includes a public telephone network which permits use of a predialing protocol that involves dialing a telephone number of the associated host computer prior to completion of transaction data entry in said transaction terminal, wherein
   said step a. further includes defining a host dial string format which includes at least one designated predial command and said host telephone number in a telephone number format determined by said public telephone network;
   said step d. is carried out after step c. and prior to completion of any transaction data entry steps;
   and said step d further comprises the steps of:
   d-1. examining said retrieved host dial string to determine if said designated predial command is present; and
   d-2a. immediately dialing the host telephone number in said retrieved host dial string if said designated predial command is present or
   d-2b. delaying the dialing the host telephone number in said retrieved host dial string until completion of transaction data entry if said designated predial command is not present.

7. The method of claim 6, wherein
said host dial string format defined in step a. comprises a first character position having a content which determines whether either or both of said predial and said fast modem connect protocols are to be utilized with the associated host computer, said content being:

a numeric character consisting of the first digit of the host telephone number if no predial or fast modem connect protocols are specified;
a first predesignated alphabetic character to indicate that a predial protocol is to be utilized without a fast connect protocol; and
a second predesignated alphabetic character to indicate that both a predial and a fast modem connect protocol are to be utilized;
said step e. and said step h. together comprise
   e. 1. examining said first character position in said retrieved host dial string;
   e. 2. setting a fast connect flag in said terminal if the content of said first character position is said second predesignated alphabetic character and immediately executing step i.; and
   e. 3. immediately executing step i. if the content of said first character position is is said first predesignated alphabetic character.

8. The method of claim 7, wherein
said host dial string format defined in step a. further comprises a last character position having a content which determines whether a fast connect protocol is to be used without a predial protocol, said content being
a numeric character comprising the last digit of a host telephone number to be dialed, or
an alphabetic character consisting of one of a set of command characters that may be invoked after dialing a host telephone number, including a third predesignated alphabetic character (which may be the same as said second predesignated alphabetic character) to indicate that said fast modem connect protocol is to be utilized,
and further comprising the steps of:
   j. dialing the host telephone number after all transaction data has been entered if said step h. indicates that said designated predial command is not present;
   k. examining the last character position in said retrieved host dial string and executing said step f. if said third predesignated alphabetic character is present, and executing said step g. if said third predesignated alphabetic character is not present.

* * * * *